May 2, 1967  E. J. WESTER  3,317,246
BICYCLE WHEEL TRIM DISCS
Filed June 22, 1965  2 Sheets-Sheet 1
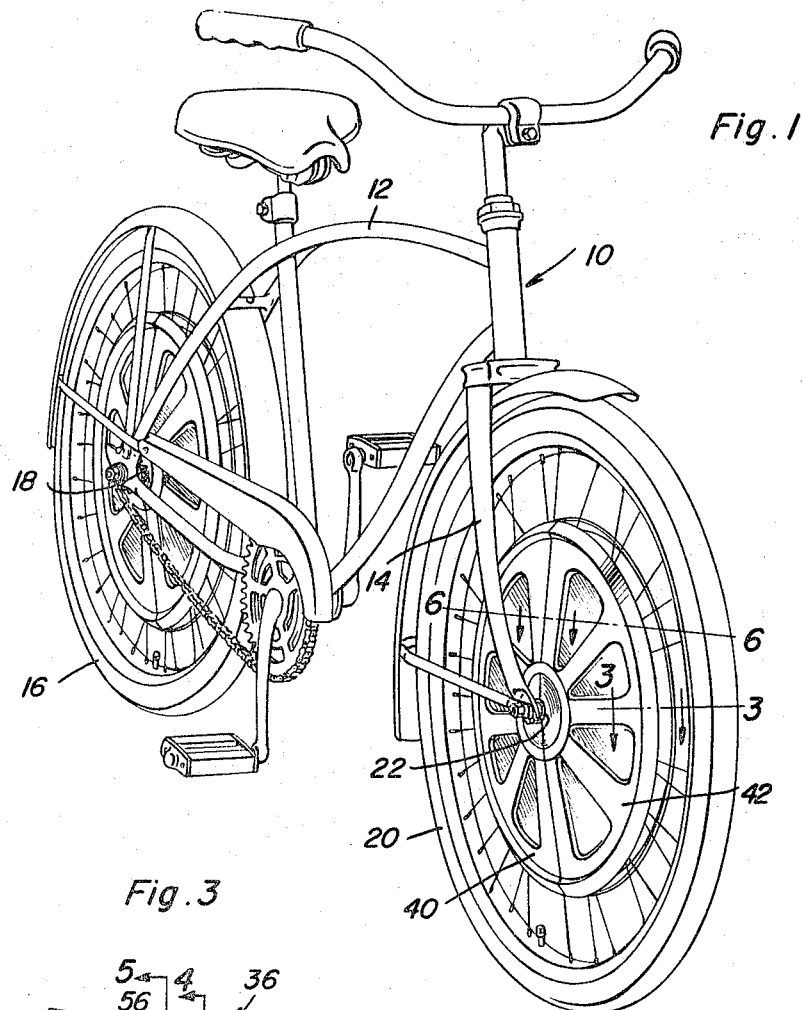
Fig. 1
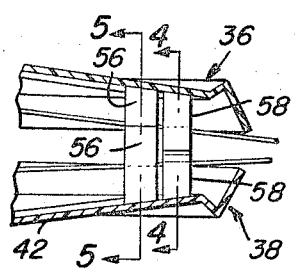
Fig. 3
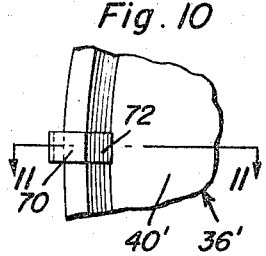
Fig. 10
Fig. 11
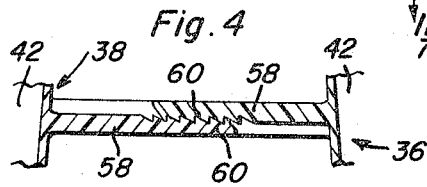
Fig. 4
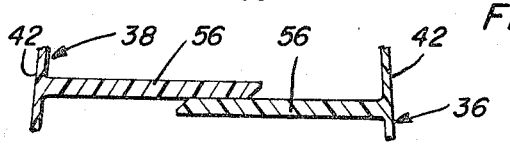
Fig. 5
Edwin J. Wester
INVENTOR.
BY Clarence A. O'Brien
and Harvey B. Jackson
Attorneys

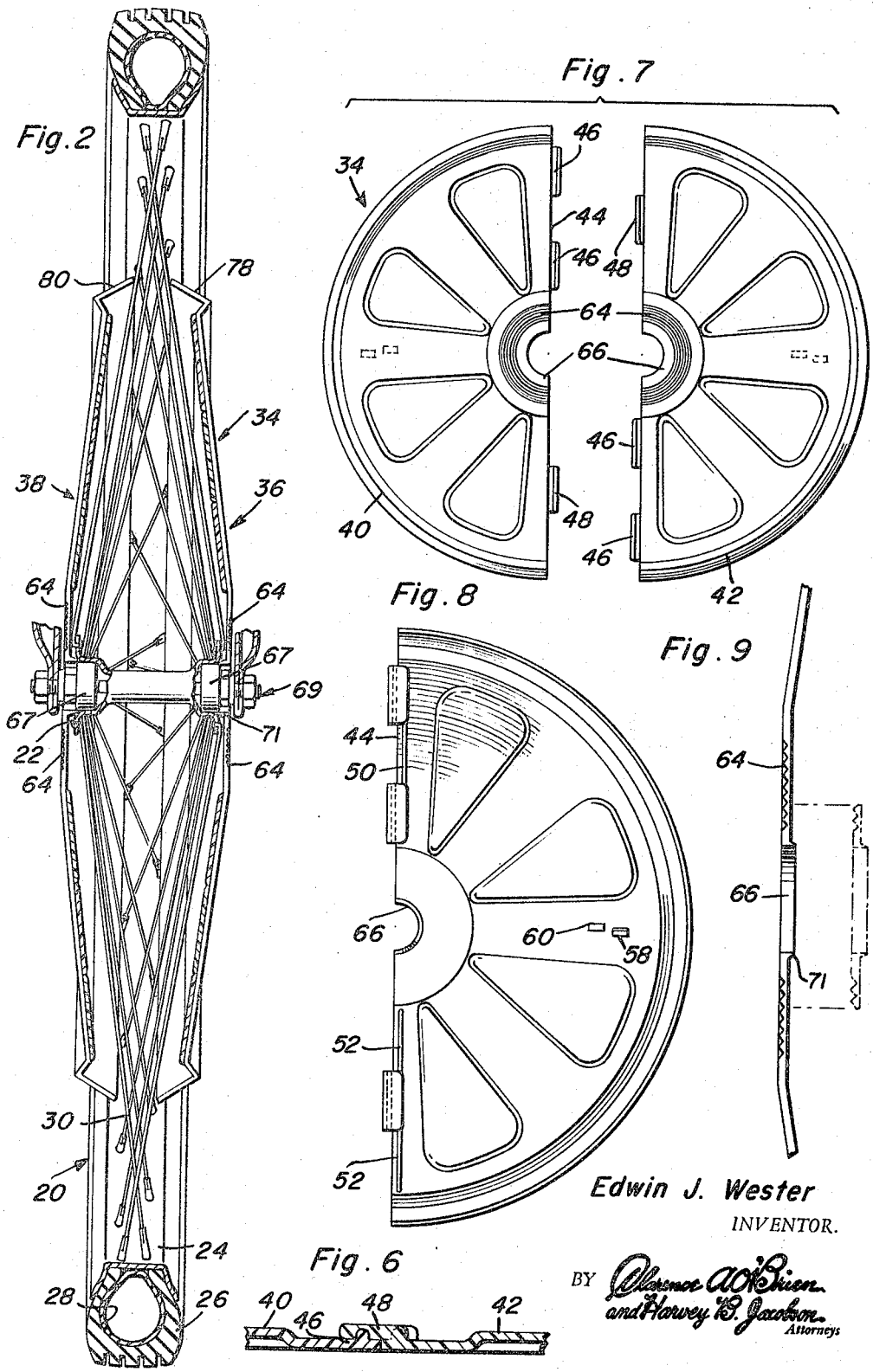

United States Patent Office 3,317,246
Patented May 2, 1967

3,317,246
BICYCLE WHEEL TRIM DISCS
Edwin J. Wester, 7018 W. Beckett Ave.,
Milwaukee, Wis. 53216
Filed June 22, 1965, Ser. No. 466,001
10 Claims. (Cl. 301—37)

This invention relates to novel and useful decorative bicycle wheel trim discs that are designed in a manner to be readily fitted to substantially all bicycles regardless of age, make, model, type or size.

The wheel trim discs of the instant invention are constructed in the form of a pair of opposite side disc members which are to be secured to opposite sides of a spoked bicycle wheel. Each of the disc members may be constructed as a single disc or as a unit comprising two half discs removably joined together along a diameter of the disc member formed thereby. The advantage in forming each of the disc members as a half disc with means provided for removably joining the half discs of each disc member is that wheel trim discs formed in this manner may be more readily secured to a mounted bicycle wheel than a solid and centrally apertured disc which would require the removal of the associated bicycle wheel before such solid discs could be applied.

It is to be understood that the outer surfaces of the wheel disc members of the instant invention are not limited to any decorative design and that they could be readily constructed so as to be a substantial duplicate of various types of hubcaps used on automobiles and other vehicles. In addition, the disc members of the instant invention may be designed so as to be well adapted to individuals customizing the discs as desired.

The wheel trim discs of the instant invention are constructed in a manner whereby they are supported from the associated bicycle wheel by means of the spokes thereof. There are two forms of the instant invention, one which provides the disc members of each wheel trim disc assembly comprising of two disc members with means for interlocking engagement with each other in a manner clamping the spokes of the associated wheel therebetween. Another form of the instant invention includes spring clips which are secured and extend between the two disc members of each wheel trim disc assembly and clampingly secure the spokes of the associated bicycle wheel therebetween.

The main object of this invention is to provide a wheel trim disc assembly for spoked wheels such as those utilized on bicycles constructed in a manner whereby a pleasing and decorative appearance may be given to bicycle wheels and the like.

Another important object of this invention is to provide a wheel trim disc assembly in accordance with the immediately preceding object and including means by which the wheel trim disc assembly may be readily attached to the associated bicycle wheel.

Still another object of this invention is to provide a wheel trim disc assembly including a pair of opposite side disc members including apertured central portions which may have the apertures formed therein readily enlarged in order that the disc members may be modified to accommodate large diameter wheel hub portions.

Still another object of this invention is to provide a wheel trim disc assembly in accordance with the preceding objects including a pair of opposite side disc members which are identically formed thereby enabling a complete wheel trim disc assembly to be formed of two opposite side disc members which are identical.

Yet another object of this invention is to provide a pair of opposite side disc members for forming a wheel trim disc assembly in accordance with the preceding objects and which opposite side disc members each comprise a pair of half disc sections joined together along a diameter of the wheel disc member with the sections of each wheel disc member being identical to further facilitate ready manufacture of the bicycle wheel trim assembly and its marketing at a lower cost.

A final object of this invention to be specifically enumerated herein is to provide a wheel trim disc assembly in accordance with the preceding objects which will conform to conventional forms of manufacture, be of simple construction and easy to install so as to provide a device that will be economically feasible, long lasting and capable of being installed by substantially every bicycle owner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a bicycle with the wheels thereof each having a wheel trim disc assembly of the instant invention mounted thereon;

FIGURE 2 is an enlarged vertical sectional view taken substantially upon a plane passing through the center of the front wheel of a bicycle;

FIGURE 3 is an enlarged fragmentary horizontal sectional view taken substantially upon the plane indicated by the section line 3—3 of FIGURE 1;

FIGURES 4 and 5 are fragmentary sectional views taken substantially upon the planes indicated by the section lines 4—4 and 5—5, respectively, of FIGURE 3;

FIGURE 6 is a fragmentary enlarged sectional view taken substantially upon the plane indicated by the section line 6—6 of FIGURE 1;

FIGURE 7 is an exploded side elevational view of one of the disc members showing the manner in which it is formed of two half disc sections;

FIGURE 8 is an enlarged side elevational view of the rear side of the left hand disc section illustrated in FIGURE 7;

FIGURE 9 is a fragmentary enlarged edge elevational view of the center portion of the left hand disc section illustrated in FIGURE 7 as seen from the right hand side thereof;

FIGURE 10 is a fragmentary side elevational view of a modified form of wheel trim disc assembly showing a modified form of securing the disc members of each disc assembly together; and FIGURE 11 is a fragmentary enlarged sectional view taken substantially upon a plane indicated by the section line 11—11 of FIGURE 10.

Referring now more specifically to the drawings the reference numeral 10 generally designates a conventional form of bicycle including a frame 12, a front fork assembly 14, a rear wheel assembly 16 journaled from a rear portion of the frame 12 and including an enlarged hub portion 18, and a front wheel assembly 20 including a small diameter hub portion 22 journaled from the lower end of the front fork assembly 14.

Inasmuch as the wheel assemblies 16 and 20 are substantially identical in configuration excepting for the size of their respective hub portions, only the details of construction of the front wheel assembly 20 will be specifically referred to.

As can best be seen in FIGURE 2 of the drawings the front wheel assembly includes a large diameter rim portion 24 on which there is mounted a tire casing 26 having an inner tube 28 disposed therein. The rim portion 24 is supported from the small diameter hub portion or assembly 22 by means of a plurality of generally radially extending wire spokes 30.

The wheel trim disc assembly of the instant invention is generally designated by the reference numeral 34 and includes a pair of opposite side disc members 36 and 38 which are of identical construction.

As can best be seen from FIGURES 6-9 of the drawings each of the disc members comprises a pair of disc half sections 40 and 42 which are also identically formed and which each is semi-spherical in plan shape.

Each of the half disc sections includes a diametric edge 44 from which one end projects a pair of grooved tongues 46 and from whose other end projects a single grooved tongue 48. The tongue 48 of each half disc section is snugly receivable between the tongues 46 of the other disc half section and each disc section, intermediate its tongue 46, is provided with a groove 50 paralleling the corresponding diametric edge 44 in which the free end portion of the tongue 48 of the other half section is seatingly receivable. In addition, the areas of each half disc section disposed on opposite sides of the tongues 48 are provided with grooves 52 also generally paralleling the corresponding diametric edge portion and in which the free end portions of the tongues 46 carried by the other half disc section are seatingly receivable. In this manner, and shown to best advantage in FIGURE 6, the half disc sections 40 and 42 may be secured together along their diametric edge portions 44.

Still further, the disc half sections each includes a pair of positioning and locking arms or projections 56 and 58 which are engageable with their counterparts on the corresponding disc half section of the opposite disc member. The operation of these projections or arms 56 and 58 is shown to best advantage in FIGURES 3-5 wherein it may be seen that the arms or projections 58 are provided with teeth 60 that are interlockingly engageable with each other. The positioning arms or projections 56 are slightly flexed, as are the arms or projections 58 and corresponding pairs of arms or projections 56 and 58 prevent rotation of the disc half sections relative to the wheel assembly on which they are mounted thereby insuring that the retaining teeth 60 of each corresponding pair of arms or projections 58 will remain engaged with each other so as to retain the opposite side disc members 36 and 38 on the associated wheel assembly.

With attention now invited to FIGURE 9 of the drawings it may be seen that the disc half sections are provided with a plurality of concentric semi-circular grooves 64 which define concentric circular grooves about a centrally disposed circular opening defined in the disc member formed thereby. The circular opening formed by each pair of semi-circular openings 66 is of a diameter adapted to snugly receive the bearing assemblies 67 of the front axle assembly 69 which journal the small diameter hub portion 22. The inner peripheries of the opposite side members include laterally projecting flanges 71 which are seatingly received in the annular areas disposed between the opposite ends of the small diameter hub portion and the corresponding outer ends of the bearing assemblies 67. Further, a selected pair of corresponding grooves 64 may be scored with a sharp instrument so as to suitably weaken the half disc members along those scored grooves. Thereafter, the portions of the half disc members disposed inwardly of the scored grooves 64 may be broken away. This of course will enlarge the center opening formed in the resulting disc members and the grooves 64 to be scored may be selected in order that the resultant enlarged opening will snugly receive the large diameter hub portion 18 of the rear wheel assembly 16.

With attention now invited to FIGURES 10 and 11 of the drawings, it may be seen that the projecting arms or arm members 56 and 58 may be eliminated by the use of a plurality of circumferentially spaced spring clips 70 including laterally directed end portions 72 and seatingly receivable in recesses 74 provided therefor in corresponding half disc sections 40' and 42' of modified disc members 36' and 38'. However, the arm members 56 and 58 and the spring clips 70 may be used together if desired.

With attention now directed to FIGURES 2 and 3 of the drawings it may be seen that the opposite side disc members 36 and 38 are slightly dished so as to generally parallel the associated spokes 30 and that their outer peripheral edge portions include inwardly directed flanges 78 and 80 for abutting engagement with the spokes 30 at the free end portions. In this manner, proper seating of the outer peripheral edge portions of the opposite side disc members 36 and 38 with the spokes 30 is assured.

The opposite side disc members 36 and 38 may be of any suitable configuration and may be constructed in a manner enabling the ultimate purchaser and user of the opposite side members 36 and 38 to add his own ornamental design to the wheel trim disc assembly.

In view of the relatively simple construction of the wheel trim disc assembly they may be given away as gifts during sale campaigns and if the trim disc assemblies were used in this manner the ornamental appearance thereof could be related in some way to the instant sales campaign.

In addition to forming the wheel trim disc assembly from a pair of opposite side disc members which are constructed in disc half sections removably secured together, each opposite side disc member could be formed of one piece and split along a radius thereof for facilitating mounting of this modified form of disc assembly on a bicycle wheel. However, in this instance the wheel trim disc assembly would have to be constructed of somewhat rigid but resilient material enabling it to be slightly flexed so as to cause the radial slit to be opened sufficiently to enable the wheel tirm disc assembly to be installed about an associated bicycle wheel hub portion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel trim disc assembly for spoked wheels of the type including a center hub and an outer rim supported from said hub by means of a plurality of spokes, said assembly comprising a pair of opposite side disc members adapted to be secured to opposite sides of a spoked wheel, each of said disc members including a central hub receiving portion with at least one concentric circular groove formed in one side thereof, said disc members being constructed of a material capable of being scored by means of a sharp implement seated in and moved through said grooves of each disc member and thereafter broken along the scored grooves to provide or enlarge a hub receiving opening adapted to snugly receive the hub of said wheel, said disc members including means adapting said disc members to be secured to opposite sides of said wheel.

2. The combination of claim 1 wherein each of said central hub receiving portions includes a set of a plurality of said grooves.

3. The combination of claim 2 wherein each of said central hub receiving portions is centrally apertured inwardly of the innermost groove of the corresponding set of grooves.

4. The combination of claim 1 wherein said means adapting said disc members to be secured to said wheel include means carried by said disc members and engageable with each other.

5. The combination of claim 1 wherein said disc members include laterally directed outer marginal flange portions whose free edges are adapted to abut said spokes and which are adapted to maintain all of said disc members except for said flange portions out of engagement with said spokes.

6. A wheel trim disc assembly for spoked wheels of the type including a center hub and an outer rim supported from said hub by means of a plurality of spokes, said assembly comprising a pair of opposite side disc members adapted to be secured to opposite sides of a spoked wheel, each of said disc members including a central hub receiving portion with at least one concentric circular groove formed in one side thereof, said disc members being constructed of a material capable of being scored by means of a sharp implement seated in and moved through said grooves of each disc member and thereafter broken along the scored grooves to provide or enlarge a hub receiving opening adapted to snugly receive the hub of said wheel, said disc members including means adapting said disc members to be secured to opposite sides of said wheel, said means adapting said disc members to be secured to said wheel including generally axially extending projections carried by the outer marginal portions of said disc members, adapted to pass between adjacent spokes of said wheel and releasably engageable with each other against axial separation of said disc members.

7. The combination of claim 6 wherein each of said disc members includes a centrally apertured hub receiving portion, said disc members each being split along a diameter thereof and defining a pair of half disc sections and including releasably engageable coacting means along the diameteric edge portions thereof securing said half disc sections together.

8. The combination of claim 6 wherein said projections overlap each other at their free ends and the confronting faces thereof include inwardly facing rack gear teeth meshed with each other.

9. The combination of claim 6 wherein said disc members include laterally directed outer marginal flange portions whose free edges are adapted to abut said spokes and which are adapted to maintain all of said disc members except for said flange portions out of engagement with said spokes.

10. The combination of claim 6 wherein said projections are overlapped circumferentially of said disc members, said disc members including additional pairs of end overlapped axially extending projections oppositely overlapped relative to the manner in which the first mentioned projections are overlapped so as to coact with the first mentioned projections and prevent relative rotational displacement of said disc members.

References Cited by the Examiner

UNITED STATES PATENTS

| 2,154,310 | 4/1939 | Kinnard. | |
| 3,004,798 | 10/1961 | Tylle | 301—37 |
| 3,141,704 | 7/1964 | Guingrich | 301—37 |

FOREIGN PATENTS

| 595,271 | 9/1925 | France. |

MILTON BUCHLER, *Primary Examiner.*

RICHARD J. JOHNSON, *Examiner.*